United States Patent
Yew et al.

(10) Patent No.: US 11,924,206 B2
(45) Date of Patent: Mar. 5, 2024

(54) SYSTEMS AND METHODS FOR PROVIDING SECURITY AND TAMPER DETECTION IN I/O SYSTEMS

(71) Applicant: Rockwell Automation Asia Pacific Business Center Pte. Ltd., Singapore (SG)

(72) Inventors: Wen Chinn Yew, Singapore (SG); Yongjie Daniel Wong, Singapore (SG)

(*) Notice: Subject to any disclaimer, the term of this patent is extended or adjusted under 35 U.S.C. 154(b) by 297 days.

(21) Appl. No.: 17/408,724

(22) Filed: Aug. 23, 2021

(65) Prior Publication Data

US 2023/0057860 A1 Feb. 23, 2023

(51) Int. Cl.
*H04L 29/06* (2006.01)
*H04L 9/40* (2022.01)

(52) U.S. Cl.
CPC ...... *H04L 63/0876* (2013.01); *H04L 63/0236* (2013.01); *H04L 63/102* (2013.01); *H04L 63/20* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 7,822,719 B1 * | 10/2010 | Noveck | ............... | G06F 16/1774 707/704 |
| 2013/0257758 A1 * | 10/2013 | Huang | ................. | G06F 3/04883 345/173 |
| 2013/0276097 A1 * | 10/2013 | Chao | ........................ | G06F 21/32 726/17 |
| 2016/0350548 A1 * | 12/2016 | Lewis | .................. | G06F 3/04842 |
| 2021/0375081 A1 * | 12/2021 | Kano | ....................... | H04L 63/10 |
| 2023/0057860 A1 * | 2/2023 | Yew | ......................... | H04L 63/20 |

FOREIGN PATENT DOCUMENTS

| | | | | | |
|---|---|---|---|---|---|
| EP | 3518133 | * | 1/2019 | ............. | H04L 29/06 |
| EP | 3518133 A1 | * | 7/2019 | ........... | G05B 19/048 |
| EP | 3518133 A1 | | 7/2019 | | |
| JP | 2005070824 A | * | 3/2005 | ............. | E05B 45/06 |

OTHER PUBLICATIONS

Anonymous: "Transaction authentication number—Wikipedia, the free encyclopedia", Mar. 13, 2015 (Mar. 13, 2015), XP055198196, Retrieved from the Internet: URL:https://en.wikipedia.org/w/index. php?title=Transaction_authentication_number&oldid=651206307.
European Patent Office, "Communication pursuant to Rule 62 EPC, Extended European Search Report", application No. 22189719.2 EPO, dated Jan. 19, 2023, 9 pages.

* cited by examiner

*Primary Examiner* — Sanchit K Sarker

(57) ABSTRACT

A network adapter within an industrial input/output (I/O) system includes one or more processers. The one or more processors are configured to: receive a first combination; determine whether the first combination matches a predefined lock combination; upon determining that the first combination matches the predefined lock combination, start a lock process; receive a second combination; determine whether the second combination matches a predefined lock key; and upon determining that the second combination matches the predefined lock key, lock the adapter.

15 Claims, 4 Drawing Sheets

SYSTEMS AND METHODS FOR PROVIDING SECURITY AND TAMPER DETECTION IN I/O SYSTEMS

FIELD OF DISCLOSURE

This disclosure generally relates to industrial automation control systems and methods, more particularly, to systems and methods for providing security and tamper detection in input/output (I/O) systems.

BACKGROUND OF DISCLOSURE

In the industrial automation systems, remote input/output (I/O) modules can communicate with controllers over a network via an adapter. For example, an EtherNet/IP adapter connected to I/O modules can enable communication between the I/O modules and the controllers over an EtherNet/IP network. The adapter can be connected to one or more I/O modules to provide power to the I/O modules and enable the I/O modules to transfer data and execute logic. The adapter usually includes a user interface that allows the user to set up the adapter. For example, a user can use the user interface that includes a rotary switch to set an IP address, change an existing IP address, entry or exit from a protected mode, and reset the adapter. To provide physical security and protect the adapter from unauthorized user input on the user interface (e.g., unauthorized user uses the rotary switch to exit a protection mode), the adapter and I/O modules are usually kept in a locked cabinet. It would be advantageous to eliminate the need of the locked cabinet and provide security and tamper detection to the I/O systems to prevent unauthorized personnel from changing the adapter settings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the features, which illustrate the exemplary embodiments in detail, it should be understood that the application is not limited to the details or methodology set forth in the description or illustrated in the figures. It should also be understood that the terminology is for the purpose of description only and should not be regarded as limiting.

Some embodiments of the present invention relate to a network adapter within an industrial I/O system including one or more processors. The one or more processors are configured to: receive a first combination; determine whether the first combination matches a predefined lock combination; upon determining that the first combination matches the predefined lock combination, start a lock process; receive a second combination; determine whether the second combination matches a predefined lock key; and upon determining that the second combination matches the predefined lock key, lock the adapter.

Some embodiments of the present invention relate to a network adapter within an industrial I/O system including one or more processors. The one or more processors are configured to: receive a first combination; determine whether the first combination matches a predefined unlock combination; upon determining that the first combination matches the predefined unlock combination, start an unlock process; receive a second combination; determine whether the second combination matches a predefined unlock key; and upon determining that the second combination matches the predefined unlock key, unlock the adapter.

Some embodiments relate to a method for locking/unlocking a network adapter of an industrial I/O system. The method includes: receiving, at the network adapter, a first combination; determine, by the network adapter, whether the first combination matches a predefined lock/unlock combination; upon determining that the first combination matches the predefined unlock combination, starting, by the network adapter, a lock/unlock process; receiving, at the network adapter, a second combination; determining, by the network adapter, whether the second combination matches a predefined lock/unlock key; and upon determining that the second combination matches the predefined unlock key, locking/unlocking the network adapter.

Figure 1:
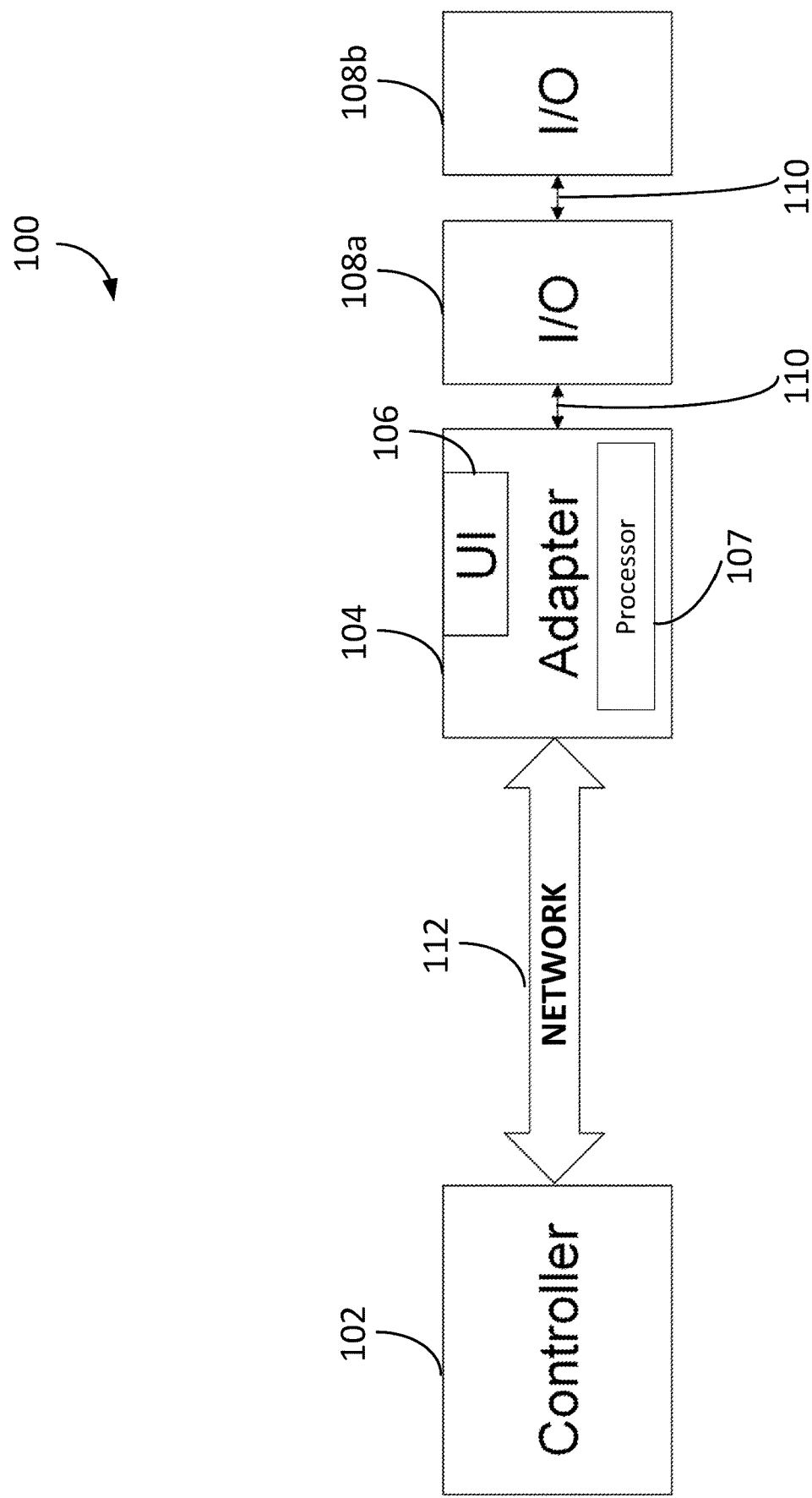
FIG. 1 is a block diagram showing an industrial control system including a controller, an I/O subsystem, and network facilitating communication between the controller and I/O subsystem according to an illustrative embodiment.

With reference now to FIG. 1, an industrial control system including a controller 102, an I/O subsystem 100, and network facilitating communication between the controller 102 and I/O subsystem 100 is shown according to an illustrative embodiment. The I/O subsystem 100 includes a network adapter 104 and one or more I/O devices 108 (e.g., I/O devices 108a and 108b). The network adapter 104 is operatively connected to an industrial automation network 112 such as an Ethernet/IP network or other industrial automation network so that the network adapter 104 receives data from, transmits data to, and otherwise communicates with the controller 102 also connected to the network 112. The controller 102 comprises one or more programmable logic controllers (PLC), microprocessors, and/or other electronic processors programmed and configured for controlling an industrial machine, process, or other controlled system. The adapter 104 and the I/O devices 108 are removably connected to a modular or chassis-based backplane 110. In some embodiments, the adapter 104 and the I/O devices 108 are connected to the backplane in a sequential manner (e.g., the adapter 104 is at an end and followed by the I/O devices 108a and 108b.) The adapter 104 provides electrical power to and communicates data with the connected I/O devices 108 though the backplane 110. The adapter 104 is configured to enable/disable communications between I/O devices 108 and the controller 102. Each of the I/O devices 108 includes one or more I/O modules (not shown) configured to perform one or more specialized input/output functions such as DC input, DC output, AC input, AC output, analog input and/or output, RTD and/or thermocouple input and/or output, or the like as is generally known in the field of industrial automation. Each of the I/O devices 108 is connected to one or more field devices (not shown). Input/output data are provided between the controller 102 and the field devices through the respective I/O devices 108 and the adapter 104.

The adapter 104 includes a user interface (UI) 106 and one or more processors 107. The UI 106 allows users to input instructions and set up the I/O system 100. The UI 106 includes any suitable input mechanisms, such as rotary switches, push buttons with number display, instruction file on a portable storage (e.g., SD card, USB devices, etc.) The one or more processors 107 can perform one or more operations described herein with reference to the adapter 104, such as lock or unlock operations, configuration operations, etc. In some embodiments, the adapter 104 is configured with a set of instructions, each instruction corresponds to a predefined unique combination of numbers, letters, symbols or any combination thereof or a predefined sequence of combinations. Upon receiving a predefined combination or a predefined sequence of combinations, the adapter 104 operates according to the corresponding instruction. For example, a first predefined input combination (e.g., 999) corresponds to an instruction of setting up IP address. Upon receiving the first input combination, the adapter 104 starts an IP address set-up process and expects receiving IP address through the UI 106. A second predefined input combination (e.g., 888) corresponds to a reset instruction. Upon receiving the second predefined input combination, the adapter 104 is reset to its initial out-of-the-box settings.

The adapter 104 is further configured with a predefined lock instruction and a predefined unlock instruction. The predefined lock instruction corresponds to a lock combination input and a lock key input. In some embodiments, the lock combination may include a unique combination of numbers with an input time duration (e.g., 555 for 5 seconds). In these embodiments, when the adapter 104 receives the lock combination input, the adapter 104 starts a locking process and expects receiving the lock key input after the input time duration. In some other embodiments, the lock combination may include a unique sequence of combinations, each associated with an input time duration (e.g., first 111 for 5 seconds, second 222 for 5 seconds, third 333 for 5 seconds.) In these other embodiments, when the adapter 104 receives the first combination (e.g., 111) of the lock combination, the adapter 104 expects receiving a second combination after 5 seconds. Upon receiving the second combination (e.g., 222), the adapter 104 expects receiving a third combination after 5 seconds. Upon receiving the third combination (e.g., 333), the adapter 104 expects receiving a lock key input after 5 seconds. The lock key is a unique combination of numbers (e.g., 388) that are provided by the I/O system. In some embodiments, the lock key may be generated by the I/O system and provided to authorized users.

When the adapter 104 receives the lock combination and the lock key, the one or more processors 107 locks the adapter 104. When the adapter 104 is locked, the adapter 104 enters a protected mode. The protected mode prevents access to services that are not required after the adapter 104 is configured and in normal operation. The protected mode disables features that can make the I/O system 100 vulnerable to disruptive actions. Under the protected mode, the adapter 104 is configured to detect and prevent unauthorized configuration changes that can affect system behavior and cause unintended and unforeseen changes to the I/O system 100. Under the protected mode, the adapter 104 is further configured to prohibit various tasks/actions including but is not limited to, changing network configuration settings (e.g., port speed), changing IP settings (e.g., changing IP address, mask, and DHCP mode), updating the adapter firmware version, disabling or re-enabling external product ports, performing remote adapter reset, disabling or enabling WWW server, disabling or enabling SNMP server, etc. For example, when the adapter 104 operates under the protected mode, an unauthorized user cannot change any settings of the adapter 104 even when the unauthorized user gains access to the network connection 112. In some embodiments, upon entering the protected mode, the adapter 104 registers an identity of each I/O device 108 connected to the adapter 104 and in run time, periodically checks whether the identity of each I/O device 108 is valid. When the adapter 104 detects an invalid identity of an I/O device, the adapter 104 may send a notification reporting the detected unauthorized I/O device to the controller 102. In some embodiments, upon detecting the invalid identity of an I/O device, the adapter 104 may reject the I/O device and prohibit communications between the I/O device and the controller 102.

Similar to the predefined lock instruction, the predefined unlock instruction corresponds to an unlock combination input and an unlock key input. The unlock combination is different from the lock combination. In some embodiments, the unlock combination may include a unique combination of numbers with an input time duration (e.g., 666 for 5 seconds). In these embodiments, when the adapter 104 receives the unlock combination input, the one or more processors 107 starts an unlocking process and expects receiving the unlock key input after the input time duration. In some other embodiments, the unlock combination may include a unique sequence of combinations, each associated with an input time duration (e.g., first 333 for 5 seconds, second 222 for 5 seconds, third 111 for 5 seconds.) In these other embodiments, when the adapter 104 receives the first combination (e.g., 333) of the unlock combination, the adapter 104 expects receiving a second combination after 5 seconds. Upon receiving the second combination (e.g., 222), the adapter 104 expects receiving a third combination after 5 seconds. Upon receiving the third combination (e.g., 111), the adapter 104 expects receiving an unlock key input after 5 seconds. The unlock key is a unique combination of numbers (e.g., 488) that provided by the I/O system. In some embodiments, the unlock key may be generated by the I/O system and provided to authorized users. In some embodiments, the unlock key may be same as the lock key. In some other embodiments, the unlock key may be different from the lock key.

When the adapter 104 receives the correct unlock combination and the correct unlock key, the adapter 104 is unlocked. When the adapter 104 is unlocked, the adapter 104 exits the protected mode. The unlocked adapter 104 allows user to conduct one or more maintenance operations such as reconfigurations, replacement, etc. For example, when a user wants to replace an I/O device and/or changing one or more settings of the adapter 104, the user can input an unlock combination through the UI 106. Upon receiving the unlock combination, the adapter 104 waits for an input unlock key. After a time duration associated with the unlock combination, the user can input an unlock key. Upon receiving the unlock key, the adapter 104 is unlocked and exits the protected mode. The unlocked adapter allows the previously prohibited actions under the protected mode. In this way, the adapter 104 can recognize an authorized user and allow the user to conduct one or more replacing and/or reconfiguring actions on the adapter 104. If the input unlock combination is incorrect (e.g., no predefined instruction can be found as being associated with the input combination), the adapter 104 may remain locked. In some embodiments, the adapter 104 may be configured with a predefined number of allowable attempts for receiving a correct unlock combination. When a user fails to enter a correct unlock combination within the predefined number of attempts, the adapter 104 may send a notification reporting the attempts to the controller 102 and prohibit further actions from the user until receiving other instructions from the controller 102.

Figure 2:
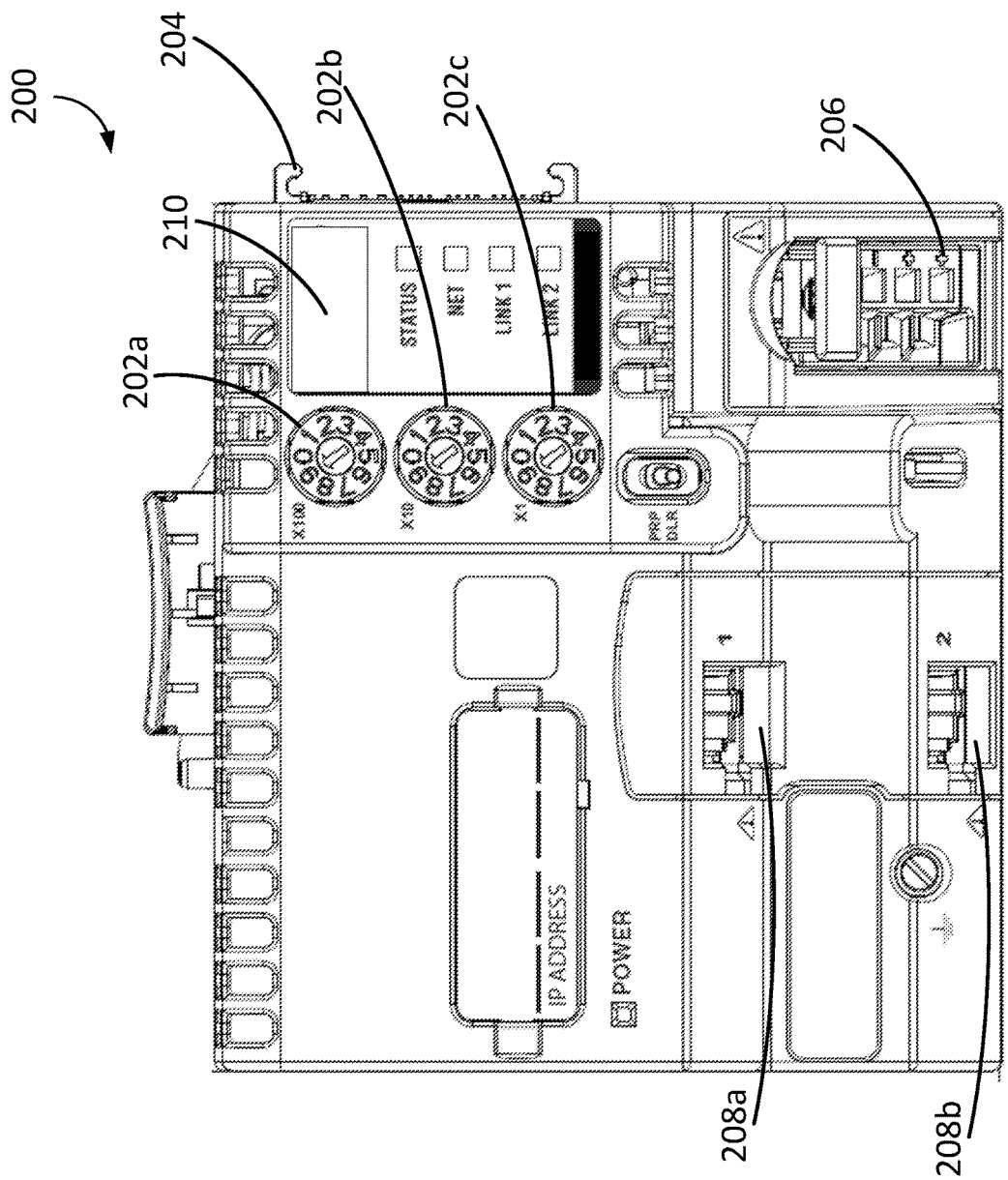
FIG. 2 shows a network adapter of the I/O subsystem, also referred to as an I/O system, according to an illustrative embodiment.

FIG. 2 shows a network adapter 200 according to an illustrative embodiment. The network adapter 200 is configured to facilitate high-speed data transfer across an industrial network (e.g., EtherNet/IP network) between one or more I/O devices and a controller in an I/O system. In some embodiments, the network adapter 200 is similar to the adapter 104 of FIG. 1. The adapter 200 includes an I/O connector 204 for connecting one or more I/O devices. The adapter 200 also includes a power removable terminal block (RTB) 206 and one or more network ports 208 (e.g., Ethernet ports 208a and 208b). The power RTB 206 provides system-side power to the one or more I/O devices. The adapter 200 is connected to the industrial network through the network port 208. The adapter 200 includes one or more processors and a memory (not shown). The one or more processors execute one or more software or firmware applications stored on the memory to provide various functionalities of the adapter 200.

The adapter includes a user interface that further includes one or more rotary switches 202 (e.g., rotary switches 202a, 202b, 202c). The rotary switches 202 are configured for the user to input one or more instructions such as setting up IP addresses, locking/unlocking the adapter 200, etc. A person skilled in the art will recognize that the rotary switches 202 are illustrated as an example input mechanism and there can be any other suitable input mechanisms, such as push buttons with number display, keyboard, instruction file on a portable storage (e.g., SD card, USB devices), etc. The rotary switches 202 allows user to input three numbers (e.g., each from numbers 0-9) in any combination. The adapter 200 is configured with a set of instructions and each instruction corresponds to a unique combination or a sequence of combinations. The adapter 200 is configured to receive the combination(s) through the rotary switches 202 and operate according to the corresponding instruction. For example, the input combination of 999 may instruct the adapter 200 to start IP setting mode. Upon receiving this combination of 999, the adapter 200 expects receiving an IP address input. The input combination of 888 corresponds to a reset instruction. Upon receiving the combination of 888, the adapter 200 resets to its initial out-of-the-box settings.

The adapter 200 is further configured with a predefined lock instruction and a predefined unlock instruction. The predefined lock instruction corresponds to a lock combination input and a lock key input. In some embodiments, the lock combination may include a unique combination of numbers with an input time duration (e.g., a first number 5 input through the rotary switch 202a, a second number 5 input through the rotary switch 202b, and a third number 5 input from the rotary switch 202c, for 5 seconds). In these embodiments, when the adapter 200 receives the lock combination input, the adapter 200 starts a locking process and expects receiving the lock key input (e.g., determining that next input is a lock key input) after the input time duration. In some other embodiments, the lock combination may include a unique sequence of combinations, each associated with an input time duration (e.g., first combination 111 for 5 seconds, second combination 222 for 5 seconds, third combination 333 for 5 seconds.) In these other embodiments, when the adapter 200 receives the first combination (e.g., 111) of the lock combination through the rotary switches 202a, 202b, and 202c, the adapter 200 expects receiving a second combination after 5 seconds. Upon receiving the second combination (e.g., 222), the adapter 200 expects receiving a third combination after 5 seconds. Upon receiving the third combination (e.g., 333), the adapter 200 expects receiving a lock key input after 5 seconds. The lock key is a unique combination of numbers (e.g., 388) that provided by the I/O system. In some embodiments, the lock key may be generated by the I/O system and provided to authorized users. In some embodiments, the time duration for the lock combination and the time duration for the lock key are predefined for the I/O system.

When the adapter 200 receives a first combination from a user, the adapter 200 determines whether the first combination matches the lock combination. Upon determining that the first combination matches the lock combination, the adapter 200 starts the lock process and expects a lock key input. The adapter 200 further receives a second combination from a user, the adapter 200 determines whether the second combination matches the lock key. Upon determining that the second combination matches the lock key, the adapter 200 is locked. When the adapter 200 is locked, the 200 enters a protected mode. Under the protected mode, the adapter 200 is configured to detect and prevent actions from unauthorized users and prohibit one or more predefined actions for providing security to the I/O system. The prohibited predefined actions include any actions that may cause security concerns, such as changing network configuration settings (e.g., port speed), changing IP settings (e.g., changing IP address, mask, and DHCP mode), updating the adapter firmware version, disabling or re-enabling external product ports, performing remote adapter reset, disabling or enabling WWW server, disabling or enabling SNMP server, replacing one or more I/O devices connected to the adapter 200, connecting unauthorized I/O device to the adapter 200, etc. For example, when the adapter 200 operates under the protected mode, an unauthorized user cannot change any settings of the adapter 200 even when the unauthorized user gains access to the network connection through which the adapter 200 communicates with the controller. In some embodiments, upon entering the protected mode, the adapter 200 registers an identity of each I/O device connected to the adapter 200 and in run time, periodically checks whether the identity of each I/O device is valid. When the adapter 200 detects an invalid identity of an I/O device, the adapter 200 may send a notification reporting the detected unauthorized I/O device to the controller. In some embodiments, upon detecting the invalid identity of an I/O device, the adapter 200 may reject the I/O device and prohibit communications between the I/O device and the controller.

Similar to the predefined lock instruction, the predefined unlock instruction corresponds to an unlock combination input and an unlock key input. The unlock combination is different from the lock combination. In some embodiments, the unlock combination may include a unique combination of numbers with an input time duration (e.g., 666 for 5 seconds). In these embodiments, when the adapter 200 receives the unlock combination input, the adapter 200 starts an unlocking process and expects receiving the unlock key input after the input time duration. In some other embodiments, the unlock combination may include a unique sequence of combinations, each associated with an input time duration (e.g., first 333 for 5 seconds, second 222 for 5 seconds, third 111 for 5 seconds.) In these other embodiments, when the adapter 200 receives the first combination (e.g., 333) of the unlock combination, the adapter 200 expects receiving a second combination after 5 seconds. Upon receiving the second combination (e.g., 222), the adapter 200 expects receiving a third combination after 5 seconds. Upon receiving the third combination (e.g., 111), the adapter 200 expects receiving an unlock key input after 5 seconds. The unlock key is a unique combination of numbers (e.g., 488) that provided by the I/O system. In some embodiments, the unlock key may be generated by the I/O system and provided to authorized users. In some embodiments, the unlock key may be same as the lock key. In some other embodiments, the unlock key may be different from the lock key.

When the adapter 200 receives a first combination from a user, the adapter 200 determines whether the first combination matches the unlock combination. Upon determining that the first combination matches the unlock combination, the adapter 200 starts the unlock process and expects receiving an unlock key input. The adapter 200 receives a second combination and determines whether the second combination matches the predefined unlock key. Upon determining that the second combination matches the unlock key, the adapter 200 is unlocked. When the adapter 200 is unlocked, the adapter 200 exits the protected mode. The unlocked adapter 200 allows user to conduct one or more maintenance operations such as reconfigurations, replacement, etc. For example, when a user wants to replace an I/O device and/or changing one or more settings of the adapter 200, the user can input an unlock combination through the rotary switches 202. Upon receiving the unlock combination, the adapter 200 waits for an unlock key input. After a time duration associated with the unlock combination, the user can input an unlock key. Upon receiving the unlock key, the adapter 200 is unlocked. When the adapter 200 is unlocked, the adapter 200 exits the protected mode and allows the previously prohibited actions under the protected mode. In this way, the adapter 200 can recognize an authorized user and allow the user to conduct one or more replacing and/or reconfiguring actions on the adapter 200. If the input unlock combination is incorrect (e.g., no predefined instruction can be found as being associated with the input combination) or if the input unlock key is incorrect, the adapter 200 may remain locked. In some embodiments, the adapter 200 may be configured with a predefined number of attempts for receiving a correct unlock combination and a correct unlock key. When a user fails to enter a correct unlock combination and unlock key within the predefined number of attempts, the adapter 200 may send a notification reporting the attempts to the controller and prohibit further actions from the user until receiving other instructions from the controller.

Figure 3:
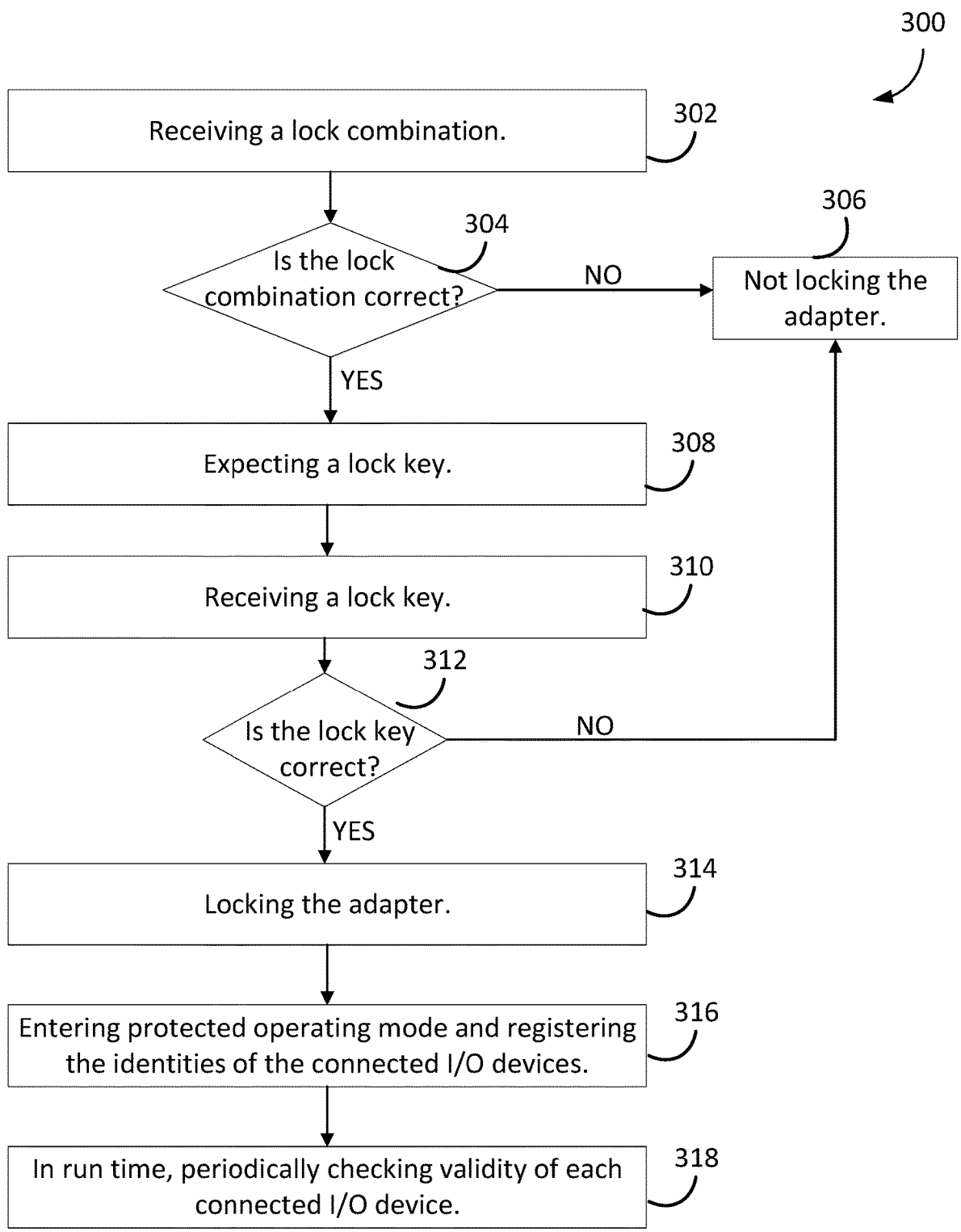
FIG. 3 shows a flow diagram of a locking process of a network adapter for providing security of an I/O system according to an illustrative embodiment.

FIG. 3 shows a flow diagram of a locking process 300 of a network adapter for providing security of an I/O system according to an illustrative embodiment. The locking process 300 provides built-in physical security of the I/O system and tamper detection. At an operation 302, the adapter receives a lock combination. The adapter may receive the lock combination through any suitable input mechanisms, such as rotary switches, push buttons, keyboards, input files stored in a portable memory device (e.g., SC card, USB devices), etc. The lock combination may be a unique combination of numbers (e.g., 5555) or a unique sequence of combination of numbers (e.g., first 5555, second 4444). In some embodiments, the lock combination may include any suitable digits of numbers according to the corresponding input mechanisms (e.g., the three digits combination input through the rotary switches as shown in FIG. 2, four digits combination input through input buttons.) In some embodiments, the lock combination may be associated with a time duration which indicates a time duration before the adapter can receive next combination.

At an operation 304, the adapter determines whether the input lock combination is correct by comparing the received lock combination with a set of predefined combinations. Each predefined combination corresponds to an operating instruction (e.g., lock, unlock, reset, set up IP, etc.) Upon determining that the received lock combination matches a predefined lock combination, at an operation 308, the adapter receives the locking instruction and expects receiving a lock key. Upon determining that the received lock combination does not match the predefined lock combination, at an operation 306, the adapter does not receive a locking instruction and stops the locking process so that the adapter remains unlocked.

At an operation 310, the adapter receives a lock key as expected. The lock key is a unique combination of numbers (e.g., 4888). In some embodiments, the lock key may be a sequence of combination of numbers (e.g., first 4888, second 3888). In some embodiments, the lock ley may be associated with a time duration which indicates a time duration before the adapter can receive next combination. The adapter may receive the lock combination through any suitable input mechanisms, such as rotary switches, push buttons, keyboards, input files stored in a portable memory device (e.g., SC card, USB devices), etc. In some embodiments, the lock key is different from the lock combination.

At an operation 312, the adapter determines whether the lock key is correct by comparing the received lock key with a predefined lock key. The predefined lock key is assigned to the adapter by the I/O system. In some embodiments, the predefined lock key may be provided by a system administer. In some other embodiments, the predefined lock key may be generated by the I/O system. Upon determining that the lock key is correct, the adapter is locked at an operation 314. Upon determining that the lock key is not correct, the adapter stops the locking process and remains unlocked.

At an operation 316, when the adapter is locked, the adapter enters a protected mode. Under the protected mode, the adapter prohibits one or more predefined actions for preventing unauthorized interaction with the I/O system. The prohibited predefined actions include any actions that may cause security concerns, such as change of certain settings of the adapter through a network connection, replacing one or more I/O devices connected to the adapter, installing unauthorized I/O device on the I/O system, etc. For example, when the adapter operates under the protected mode, an unauthorized user cannot change any settings of the adapter even when the unauthorized user gains access to the network connection. When the adapter is locked, the adapter also registers all the I/O devices that are connected to the adapter.

At an operation 318, while the I/O system is running (e.g., in run time), the adapter periodically checks whether identities of the currently connected I/O devices are valid by comparing the identities of the current I/O devices to the identities of the registered I/O devices. If any current I/O device does not match the registered I/O devices, the adapter may send a notification reporting the detected invalid I/O device(s) to a controller of the I/O system.

Figure 4:
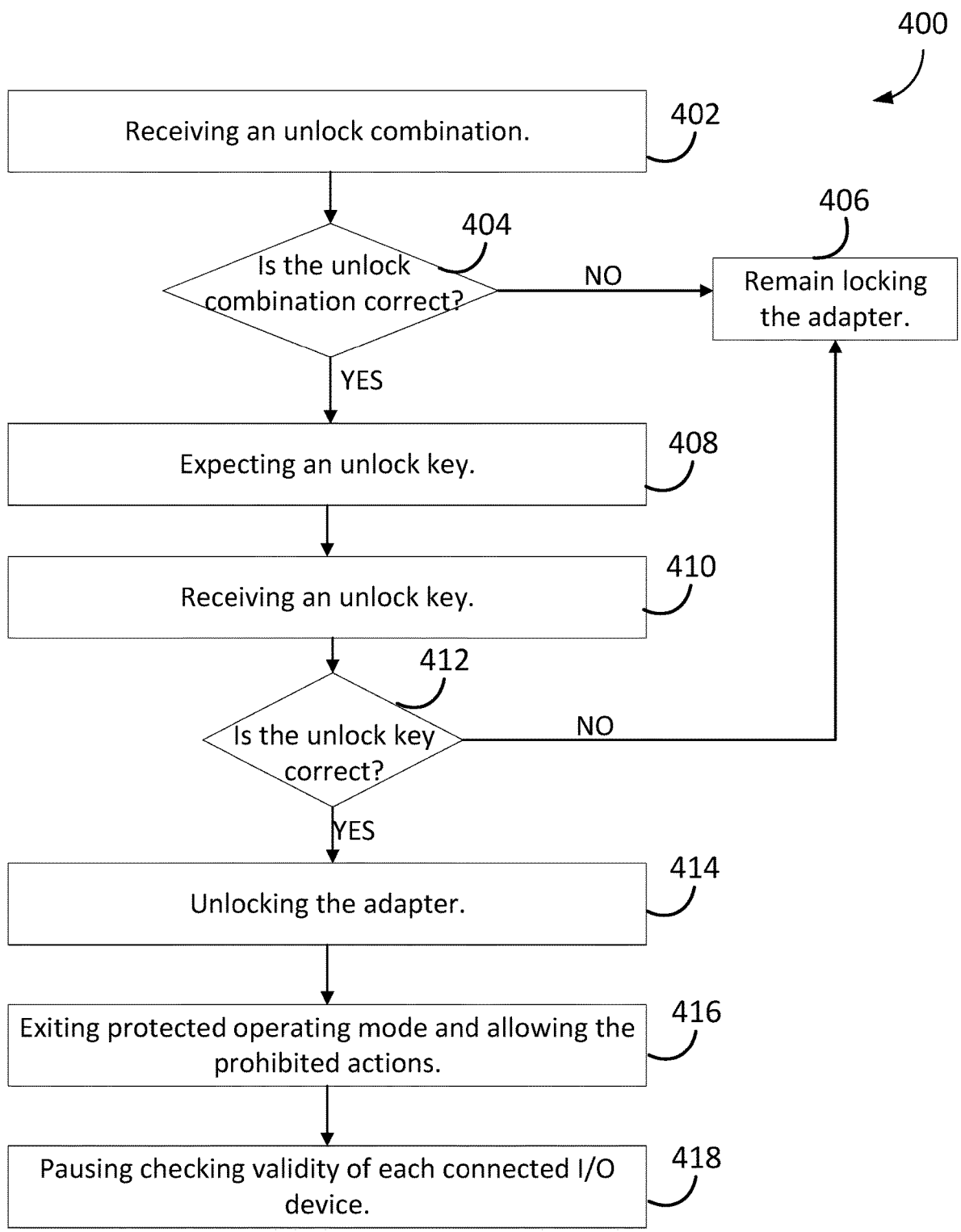
FIG. 4 shows a flow diagram of an unlocking process of a network adapter for providing maintenance or changes to a secured I/O system according to an illustrative embodiment.

FIG. 4 shows a flow diagram of an unlocking process 400 of a network adapter for providing maintenance or changes to a secured I/O system according to an illustrative embodiment. At an operation 402, the adapter receives an unlock combination. The adapter may receive the unlock combination through any suitable input mechanisms, such as rotary switches, push buttons, keyboards, input files stored in a portable memory device (e.g., SC card, USB devices), etc. The unlock combination may be a unique combination of numbers (e.g., 6666) or a unique sequence of combination of numbers (e.g., first 4444, second 5555). In some embodiments, the unlock combination may include any suitable digits of numbers according to the corresponding input mechanisms (e.g., the three digits combination input through the rotary switches as shown in FIG. 2, four digits combination input through input buttons.) In some embodiments, the unlock combination may be associated with a time duration which indicates a time duration before the adapter can receive next combination.

At an operation 404, the adapter determines whether the input unlock combination is correct by comparing the received unlock combination with a set of predefined combinations. Each predefined combination corresponds to an operating instruction (e.g., lock, unlock, reset, set up IP, etc.) Upon determining that the received unlock combination matches a predefined unlock combination, at an operation 408, the adapter receives the unlocking instruction and expects receiving an unlock key. Upon determining that the received unlock combination does not match the predefined unlock combination, at an operation 406, the adapter does not receive an unlocking instruction and stops the unlocking process so that the adapter remains locked.

At an operation 410, the adapter receives an unlock key as expected. The unlock key is a unique combination of numbers (e.g., 4888). In some embodiments, the unlock key may be a sequence of combination of numbers (e.g., 4888, 3888). In some embodiments, the unlock ley may be associated with a time duration which indicates a time duration before the adapter can receive next combination. The adapter may receive the unlock combination through any suitable input mechanisms, such as rotary switches, push buttons, keyboards, input files stored in a portable memory device (e.g., SC card, USB devices), etc. In some embodiments, the unlock key is different from the unlock combination.

At an operation 412, the adapter determines whether the unlock key is correct by comparing the received unlock key with a predefined unlock key. The predefined unlock key is assigned to the adapter by the I/O system. In some embodiments, the predefined unlock key may be provided by a system administer. In some other embodiments, the predefined unlock key may be generated by the I/O system. Upon determining that the unlock key is correct, the adapter is unlocked at an operation 414. Upon determining that the unlock key is not correct, the adapter stops the unlocking process and remains locked.

At an operation 416, when the adapter is unlocked, the adapter exits a protected mode. Under the protected mode, the adapter prohibits one or more predefined actions for preventing unauthorized interaction with the I/O system. The prohibited predefined actions include any actions that may cause security concerns, such as change of certain settings of the adapter through a network connection, replacing one or more I/O devices connected to the adapter, installing unauthorized I/O device on the I/O system, etc. Upon exiting the protected mode, the adapter allows the prohibited predefined actions. For example, when the adapter exits the protected mode, an authorized user may change any settings of the adapter over the network connection. When the adapter is unlocked, user may replace one or more I/O devices. At an operation 418, when the adapter is unlocked, the adapter also pauses the validity check of the connected I/O devices.

The disclosure is described above with reference to drawings. These drawings illustrate certain details of specific embodiments that implement the systems and methods and programs of the present disclosure. However, describing the disclosure with drawings should not be construed as imposing on the disclosure any limitations that are present in the drawings. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller", "an industrial controller", and "a computer", should be understood to include any general computing device suitable for the recited function including workstations, industrial controllers, personal or desktop computers, servers, cloud, computers, and the like operating locally or remotely to other elements of the invention.

References to "one or more processors" should be understood to include one or more processors that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It should be noted that although the flowcharts provided herein show a specific order of method steps, it is understood that the order of these steps can differ from what is depicted. Also, two or more steps can be performed concurrently or with partial concurrence. Such variation will depend on the software and hardware systems chosen and on designer choice. It is understood that all such variations are within the scope of the disclosure.

While the foregoing written description of the methods and systems enables one of ordinary skill to make and use what is considered presently to be the best-mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A network adapter within an industrial input/output (I/O) system, comprising:
one or more processors configured to:
receive a first combination;
determine whether the first combination matches a predefined lock combination;
upon determining that the first combination matches the predefined lock combination, start a lock process;
receive a second combination;
determine whether the second combination matches a predefined lock key; and
upon determining that the second combination matches the predefined lock key, lock the network adapter to prohibit one or more predefined actions that change settings of the network adapter through a network connection,
wherein upon the network adapter being locked, the network adapter enters a protected mode; and
upon the network adapter entering the protected mode, register identities of one or more I/O devices that are connected to the network adapter and prohibit communication with unregistered I/O devices.

2. The network adapter of claim 1, further comprises a user interface configured to receive the first combination and the second combination from a user, wherein the first combination comprises one or more combinations of numbers.

3. The network adapter of claim 2, wherein the user interface is configured to receive an IP setup combination to start an IP setting process and receive an IP address input from the user.

4. The network adapter of claim 1, wherein the one or more predefined actions comprise one or more of changing network configuration settings, changing IP settings, updating a firmware version, disabling or re-enabling external product ports, performing remote adapter reset, disabling or enabling a WWW server, and disabling or enabling a SNMP server.

5. The network adapter of claim 1, wherein the one or more processors are configured to, upon the network adapter entering the protected mode, periodically, in run time, check validity of each I/O device connected to the network adapter.

6. The network adapter of claim 5, wherein the one or more processors are configured to check validity of each I/O device connected to the network adapter by comparing an identity of each I/O device to the registered identities.

7. The network adapter of claim 6, wherein the one or more processors are configured to send a notification to a controller of the industrial I/O system if an identity of an I/O device does not match any registered identities.

8. A network adapter within an industrial input/output (I/O) system, comprising:
one or more processors configured to:
register identities of one or more I/O devices that are connected to the network adapter and prohibit communication with unregistered I/O devices, wherein the network adapter is locked and has entered a protected mode;
receive a first combination;
determine whether the first combination matches a predefined unlock combination;
upon determining that the first combination matches the predefined unlock combination, start an unlock process;
receive a second combination;
determine whether the second combination matches a predefined unlock key; and
upon determining that the second combination matches the predefined unlock key, unlock the network adapter to allow one or more predefined actions that change settings of the network adapter through a network connection,
wherein upon the network adapter being unlocked, the network adapter exits the protected mode.

9. The network adapter of claim 8, further comprises a user interface configured to receive the first combination and the second combination from a user, wherein the first combination comprises one or more combinations of numbers.

10. The network adapter of claim 8, wherein the one or more predefined actions comprise one or more of changing network configuration settings, changing IP settings, updating a firmware version, disabling or re-enabling external product ports, performing remote adapter reset, disabling or enabling a WWW server, and disabling or enabling a SNMP server.

11. The network adapter of claim 8, wherein upon the network adapter exiting the protected mode, the one or more processors allow replacing the one or more I/O devices.

12. The network adapter of claim 8, wherein upon the network adapter exiting the protected mode, the one or more processors are configured to pause checking validity of each I/O device connected to the network adapter.

13. A method for locking a network adapter of an industrial I/O system, comprising:
receiving, at the network adapter, a first combination;
determining, by the network adapter, whether the first combination matches a predefined lock combination;
upon determining that the first combination matches the predefined lock combination, starting, by the network adapter, a lock process;
receiving, at the network adapter, a second combination;
determining, by the network adapter, whether the second combination matches a predefined lock key;
upon determining that the second combination matches the predefined lock key, locking the network adapter, wherein when the network adapter is locked, the network adapter prohibits one or more predefined actions that change settings of the network adapter through a network connection;
upon the network adapter being locked, entering, by the network adapter, a protected mode; and
upon entering the protected mode, registering, by the network adapter, identities of one or more I/O devices that are connected to the network adapter and prohibiting, by the network adapter, communication with unregistered I/O devices.

14. The method of claim 13, further comprising:
receiving, at the network adapter, a third combination;
determining, by the network adapter, whether the third combination matches a predefined unlock combination;
upon determining that the third combination matches the predefined unlock combination, starting, by the network adapter, an unlock process;
receiving, at the network adapter, a fourth combination;
determining, by the network adapter, whether the fourth combination matches a predefined unlock key;
upon determining that the fourth combination matches the predefined unlock key, unlocking the network adapter; and upon the network adapter being unlocked, exiting, by the network adapter, the protected mode.

15. The method of claim 13, further comprising:
upon entering the protected mode,
checking, by the network adapter, validity of each I/O device in run time.